United States Patent
Fassbender et al.

(10) Patent No.: US 9,951,399 B2
(45) Date of Patent: Apr. 24, 2018

(54) SEPARATION OF PROTACTINUM, ACTINIUM, AND OTHER RADIONUCLIDES FROM PROTON IRRADIATED THORIUM TARGET

(71) Applicant: Los Alamos National Security, LLC, Los Alamos, NM (US)

(72) Inventors: Michael E. Fassbender, Los Alamos, NM (US); Valery Radchenko, Los Alamos, NM (US)

(73) Assignee: Los Alamos National Security, LLC, Los Alamos, NM (US)

(*) Notice: Subject to any disclaimer, the term of this patent is extended or adjusted under 35 U.S.C. 154(b) by 480 days.

(21) Appl. No.: 14/681,320

(22) Filed: Apr. 8, 2015

(65) Prior Publication Data

US 2015/0292061 A1   Oct. 15, 2015

Related U.S. Application Data

(60) Provisional application No. 61/977,497, filed on Apr. 9, 2014.

(51) Int. Cl.
*C22B 60/02* (2006.01)
*C22B 7/00* (2006.01)

(52) U.S. Cl.
CPC .......... *C22B 60/0295* (2013.01); *C22B 7/006* (2013.01); *C22B 60/026* (2013.01); *Y02P 10/234* (2015.11)

(58) Field of Classification Search
None
See application file for complete search history.

(56) References Cited

PUBLICATIONS

Radchenko et al., "Application of ion exchange and extraction chromatography to the separation of actinium from proton-irradiated thorium metal for analytical purposes," *Journal of Chromatography A*, vol. 1380, pp. 55-63, Feb. 6, 2015.

Primary Examiner — Melissa S Swain
(74) Attorney, Agent, or Firm — Klarquist Sparkman, LLP

(57) ABSTRACT

Protactinium, actinium, radium, radiolanthanides and other radionuclide fission products were separated and recovered from a proton-irradiated thorium target. The target was dissolved in concentrated HCl, which formed anionic complexes of protactinium but not with thorium, actinium, radium, or radiolanthanides. Protactinium was separated from soluble thorium by loading a concentrated HCl solution of the target onto a column of strongly basic anion exchanger resin and eluting with concentrated HCl. Actinium, radium and radiolanthanides elute with thorium. The protactinium that is retained on the column, along with other radionuclides, is eluted may subsequently treated to remove radionuclide impurities to afford a fraction of substantially pure protactinium. The eluate with the soluble thorium, actinium, radium and radiolanthanides may be subjected to treatment with citric acid to form anionic thorium, loaded onto a cationic exchanger resin, and eluted. Actinium, radium and radiolanthanides that are retained can be subjected to extraction chromatography to separate the actinium from the radium and from the radio lanthanides.

11 Claims, 7 Drawing Sheets

SEPARATION OF PROTACTINUM, ACTINIUM, AND OTHER RADIONUCLIDES FROM PROTON IRRADIATED THORIUM TARGET

PRIORITY CLAIM TO RELATED APPLICATION

This application claims the benefit of U.S. Provisional Application No. 61/977,497 entitled "Separation of Actinium and Other Radionuclides From Proton Irradiated Thorium Target," filed Apr. 9, 2014, which is hereby incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD

The present invention relates generally to the separation of protactinium, actinium, radium, and other radionuclide fission products from a proton-irradiated target of thorium metal.

BACKGROUND

Actinium-225 (Ac-225, $^{225}$Ac), radium-223 (Ra-223, $^{223}$Ra)), uranium-230 (U-230, $^{230}$U), and bismuth-213 (Bi-213, $^{213}$Bi)) are examples of alpha-emitting radionuclides useful for radiation treatment of tumors and other cancers. Actinium-225 in combination with various biomolecules (e.g. antibodies), for example, is a promising system for tumor alpha therapy. FIG. 1 provides a schematic block diagram of the decay of Ac-225, which has a half-life of 10 days (i.e. $t_{1/2}=10$ d) and undergoes alpha decay to form francium-221. FIG. 2 provides a schematic block diagram of the decay of Ac-227. According to FIG. 1, Francium-221 undergoes alpha decay to form astatine-217, which also undergoes alpha decay to form bismuth-213. A generator system of actinium-225/bismuth-213 provides an accelerator independent source of bismuth-213 for medical applications. Similarly, a generator system of uranium-230 ($t_{1/2}=20.8$)/thorium-226 ($t_{1/2}=31$ min) provides an accelerator-independent source of thorium-226, which has potential for the treatment of metastatic disease.

Thorium metal as a target in combination with proton beam irradiation provides a convenient source of protactinium-230, actinium-225, radium-223, and other radionuclides. Table 1 provides a partial listing of radionuclides resulting from irradiation of a thorium target using a proton beam having an incident proton energy of 300 MeV and an internal beam intensity of about 3.5 microamperes (see: Filosofov et al. in "Isolation of radionuclides from thorium targets irradiated with 300 MeV protons," Radiochemistry, 2013, vol. 55, no. 4, pp. 410-417, incorporated by reference). The radionuclides are listed in order of increasing mass number, along with their corresponding half-lives ($t_{1/2}$) and production rates.

TABLE 1

| Radionuclide | Half-life ($t_{1/2}$), days | Production rate, KBq/h |
|---|---|---|
| Beryllium-7 | 53.3 | 90 |
| Rubidium-83 | 86.2 | 50 |

TABLE 1-continued

| Radionuclide | Half-life ($t_{1/2}$), days | Production rate, KBq/h |
|---|---|---|
| Yttrium-88 | 106.6 | 150 |
| Zirconium-95 | 64.0 | 4400 |
| Niobium-95 | 35.0 | 1100 |
| Ruthenium-103 | 39.4 | 6000 |
| Ruthenium-106 | 373.6 | 600 |
| Silver-111 | 7.5 | 8000 |
| Indium-114m | 49.5 | 1000 |
| Cadmium-115 | 2.2 | 7000 |
| Tin-113 | 115.1 | 10 |
| Tin-117m | 13.6 | 400 |
| Tin-125 | 9.6 | 1500 |
| Antimony-124 | 60.3 | 1300 |
| Antimony-126 | 12.4 | 3300 |
| Tellurium-121m | 154 | 70 |
| Tellurium-123m | 119.7 | 160 |
| Tellurium-127m | 109.0 | 100 |
| Tellurium-129m | 33.6 | 1200 |
| Cesium-136 | 13.2 | 1200 |
| Barium-131 | 11.5 | 500 |
| Barium-140 | 12.75 | 2200 |
| Cerium-139 | 137.6 | 100 |
| Cerium-141 | 32.5 | 900 |
| Cerium-144 | 284.8 | 50 |
| Bismuth-205 | 15.3 | 500 |
| Bismuth-206 | 6.2 | 2300 |
| Radium-223 | 11.4 | 7000 |
| Actinium-225 | 10.0 | 6700 |
| Thorium-227 | 18.7 | 3000 |

Uranium-230 is a decay product of protactinium-230. Only traces of protactinium occur in nature as protactinium-231 ($t_{1/2}=3.28 \cdot 10^4$ a) and protactinium-234 ($t_{1/2}=6.7$ h). A well-characterized artificial isotope of protactinium is protactinium-233 ($t_{1/2}=27.0$ d), which is formed as an intermediate during the production of fissile uranium-233 in thorium fast breeder reactors. The interest in thorium breeder reactors provided an impetus for the recovery of gram-scale quantities of protactinium-233. The element also plays a role both in geochronological dating and nuclear forensics where the system $^{231}$Pa/$^{235}$U is utilized as a chronometer. This chronometer often corresponds with the $^{230}$Th/$^{234}$U decay pair and thus calls for efficient analytical Th/Pa chemical separation techniques.

The isotope protactinium-230 ($^{230}$Pa, $t_{1/2}$ 17.4 d (days)) partially decays to the alpha emitting radioisotope $^{230}$U ($t_{1/2}$20.8 d) may be used for targeted alpha therapy ("TAT") applications. It may be utilized directly or as a parent of $^{226}$Th ($t_{1/2}=31$ min), analogous to the known $^{225}$Ac/$^{213}$Bi system. Due to the high specific radioactivity of protactinium-230, its recovery from irradiated thorium involves separating relatively small amounts of Pa from a much larger irradiated mass of thorium.

Methods for separating protactinium from thorium have been reported. These methods involve precipitation, solvent extraction, and ion exchange. The main obstacle for separating protactinium from thorium and for subsequent purification of the protactinium is that the most stable valence of protactinium, i.e. Pa(V), does not form simple cations in aqueous solutions. Pa(V) also tends to undergo hydrolysis form polymers. Protactinium(V) also tends to become adsorbed onto most available surfaces.

The availability of alpha radionuclides such as actinium-225, radium-223, and protactinium-230 as a precursor for uranium-230 for radiation therapy does not meet the current need. Both accelerator production methods and efficient bulk chemical recovery methods determine the availability of these isotopes to the user community.

Methods for separating actinium, protactinium, radium, and other radionuclide fission products from proton-irradiated targets of thorium remain desirable. Also desirable are methods for further purification of radionuclide fission products already separated from the bulk of the target (i.e. thorium).

SUMMARY

To achieve the foregoing and other objects, and in accordance with the purposes of the present invention, as embodied and broadly described herein, an embodiment process for separating protactinium from a proton-irradiated thorium metal target is provided. The process includes forming a solution by dissolving a proton-irradiated thorium target in a concentrated solution of hydrochloric acid suitable for forming anionic chloro complexes of protactinium. The solution is loaded onto a column of strongly basic anion exchanger resin. The soluble cationic thorium, soluble cationic actinium, and soluble cationic radium are eluted from the column using a solution of concentrated hydrochloric acid while the anionic chloro complexes of protactinium are retained on the column, thereby separating protactinium from a proton-irradiated thorium metal target.

An embodiment process for separating protactinium and actinium from thorium is also provided. The process includes forming a solution by dissolving a proton-irradiated thorium target in a concentrated solution of hydrochloric acid suitable for forming anionic chloro complexes of protactinium. The solution is loaded onto a column of strongly basic anion exchanger resin suitable for retaining the anionic chloro complexes of protactinium while eluting soluble cationic thorium, soluble cationic actinium, and soluble cationic radium. The cationic soluble thorium, soluble cationic actinium, and soluble cationic radium are eluted from the column, while the anionic chloro complexes of protactinium are retained on the column. The eluate, which contains the soluble thorium, soluble actinium, and soluble radium, as well as other radionuclides, is loaded onto a column of a cation exchanger resin suitable for retaining the soluble cationic actinium more strongly than the soluble cationic thorium. The thorium is eluted through the resin while the actinium is preferentially retained on the resin, thereby separating actinium from thorium.

An embodiment process for separating protactinium, actinium, and radium from thorium is also provided. The process includes forming a solution by dissolving a proton-irradiated thorium target in a concentrated solution of hydrochloric acid suitable for forming anionic chloro complexes of protactinium. The solution is loaded onto a column of strongly basic anion exchanger resin suitable for retaining the anionic chloro complexes of protactinium while eluting soluble cationic thorium, soluble cationic actinium, and soluble cationic radium. The soluble cationic thorium, actinium, and radium are eluted from the column while the soluble anionic complexes of protactinium are retained on the column. The eluate is loaded onto a column of a cation exchanger resin. The thorium is eluted from the column of resin while the actinium is preferentially retained on the resin. The eluate from the cation exchanger resin is loaded onto a column of solid-supported extraction chromatography phase. The radium ions are eluted first from the solid-supported extraction chromatography phase. Next, the actinium ions are eluted from the column. Finally, the radiolanthanides are eluted from the column of solid-supported extraction chromatography phase.

Another embodiment process for separating protactinium from an irradiated thorium target includes forming a solution by dissolving a proton-irradiated thorium metal target in hydrochloric acid and hexafluorosilicate and filtering away any undissolved solids. The filtrate is then evaporated to dryness to form a residue. The residue is dissolved in a relatively concentrated (about 6M to about 10M) solution of nitric acid, and the resulting solution loaded onto a column of a solid-supported cation exchanger and eluted under conditions suitable for retaining protactinium cations while eluting thorium and other radionuclides present in the nitric acid solution, and thereafter recovering the protactinium cations from the solid-support phase.

DETAILED DESCRIPTION

Figure 1:
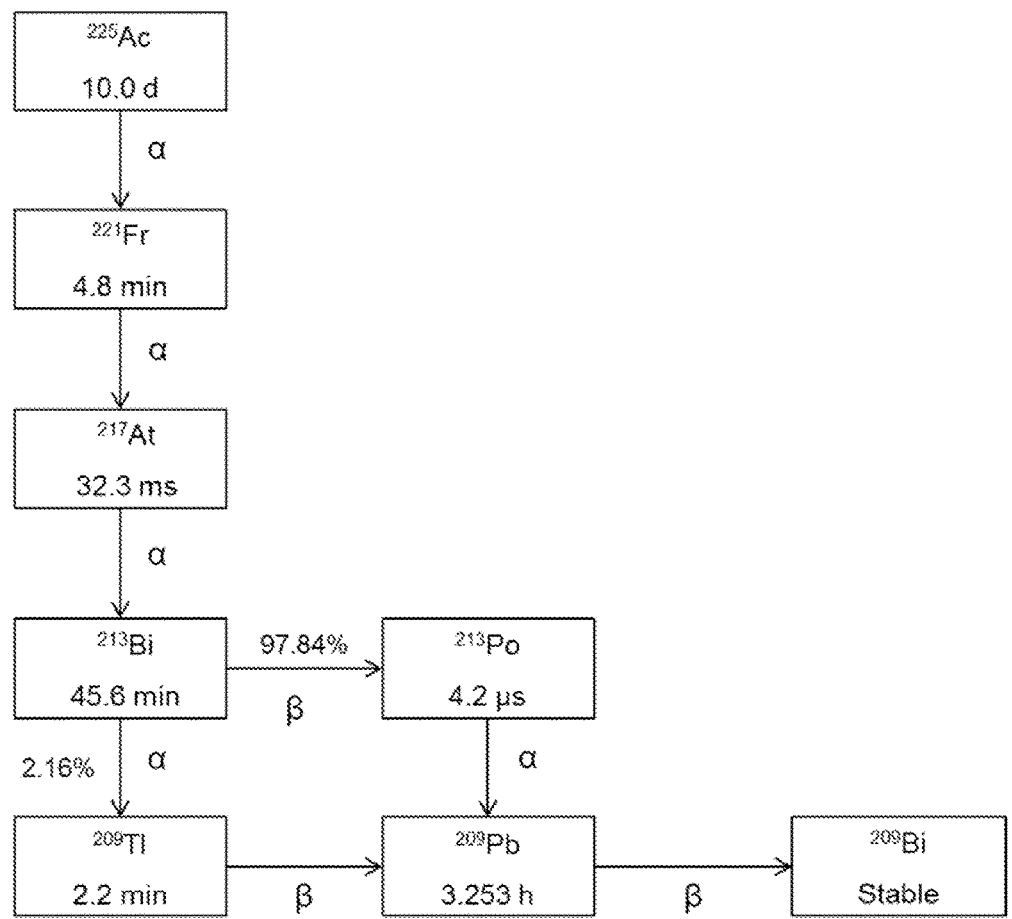
FIG. 1 provides a schematic block diagram of the decay of Ac-225.
Figure 2:
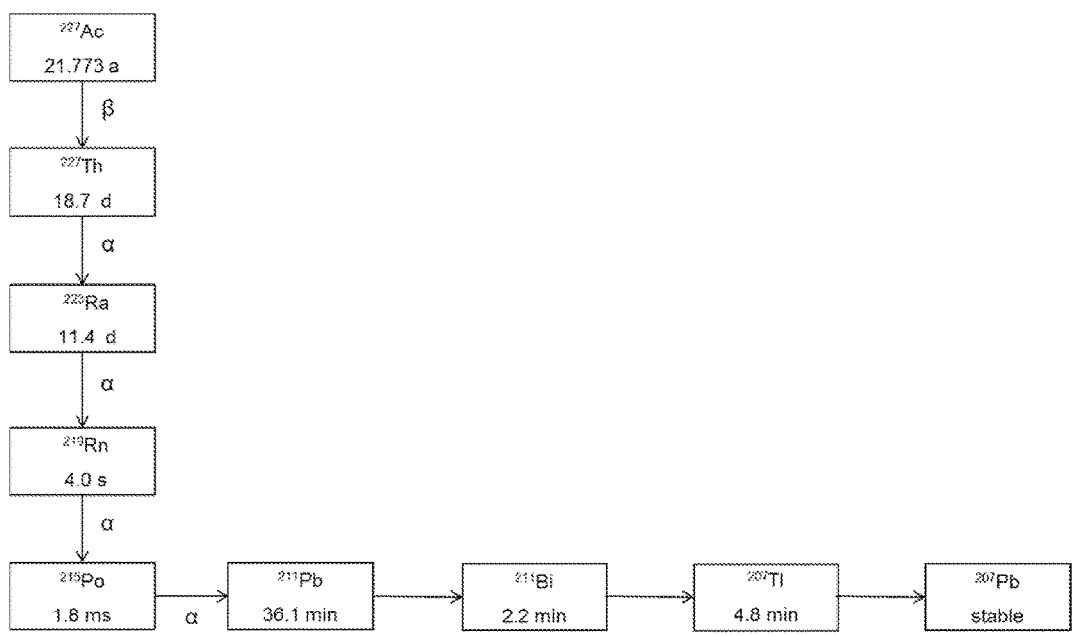
FIG. 2 provides a schematic block diagram of the decay of Ac-227.

Embodiments relate to a process involving the generation of alpha-emitting radionuclides by suitable irradiation of a thorium target with a proton beam, then forming a solution of the irradiated target, separating radionuclides from the bulk of the dissolved target. Radionuclides present in the target after proton beam irradiation include, but are not limited to, those of the following elements: protactinium (e.g. protactinium-230), actinium (e.g. actinium-225), and (e.g. radium-223), and various radiolanthanides. Some of the alpha-emitting radionuclides may be useful for treating certain types of cancers. The radionuclides cannot be separated directly from the irradiated target and must first be made soluble by dissolving the irradiated target in an acid. The irradiated thorium metal target may be dissolved in a solution of concentrated hydrochloric acid ("HCl"). A small amount of ammonium hexafluorosilicate ("$NH_4SiF_6$")) or other suitable fluorinating agent may be added to dissolve thorium oxide ("ThO$_2$") that may coat the target. Undissolved material may be filtered away, leaving a filtrate for further processing.

In some embodiments, separation of protactinium radionuclides from the irradiated target is desirable. Separation of protactinium from thorium is made possible according to the embodiment process because (1) protactinium(V) forms soluble anionic (i.e. negatively charged) chloro-complexes in concentrated hydrochloric acid solution, (2) soluble thorium remains cationic under these conditions; and (3) anionic complexes of protactinium may be separated from the soluble cationic thorium using a strongly basic anion exchanger column under conditions that maintain the protactinium in the form of soluble anionic chloro complexes. Thus, by loading the solution of irradiated target onto a column of strongly basic anion exchanger and using a concentrated HCl matrix for the elution, protactinium (present as anionic chloride complexes) preferentially adsorbs on the column of resin while the bulk of the target (i.e. cationic thorium) as well as other cationic radionuclides elute through the column of resin.

An example of a strongly basic anion exchanger suitable for preferential sorption of anionic chloro complexes of protactinium is a polymeric material having quaternary ammonium functional groups attached to a styrene/divinyl-benzene copolymer lattice. This type of material is commercially available and goes by the following commercial names: BIORAD AG1, BIORAD AG 1×8, and BIORAD AG 1×4, chloride form. Another suitable, commercially available material for preferential sorption of anionic chloro complexes of protactinium is a macroporous anion exchange resin known as BIORAD MP-1 having the chloride form. This resin can exchange anions of salts and ampholytes. This resin can be used to preferentially extract anionic chloro complexes of protactinium from a solution containing a mixture of other radionuclides.

Other ions besides protactinium radionuclides (e.g. protactinium-230 protactinium-229, protactinium-231, protactinium-232) form or are believed to form anionic chloro complexes. These include but are not limited to niobium, antimony, ruthenium and zirconium, which are believed to be present as anionic chloro complexes in a concentrated solution of hydrochloric acid (e.g. 12 M HCl). These anionic chloro-complexes are retained, with the protactinium, on a column of strongly basic anion exchange resin. Radionuclide ions of elements including but not limited to thorium, actinium, radium, antimony, radiolanthanides (e.g. cerium) are present as cationic species that do not sorb strongly on a strongly basic anion exchange rein. Loading the strongly acidic solution of the target onto such a column and using a concentrated solution of HCl (e.g. 12 M HCl) for elution would result in preferential sorption of the anionic chloride complexes and elution of the cationic species through the column.

After elution, the eluate may be evaporated to form a residue that can be redissolved in another medium (e.g. nitric acid), if desirable.

Other radionuclides besides protactinium remain sorbed onto the column of strongly basic anion exchanger resin. Ions of zirconium radionuclides and niobium radionuclides, for example, are also sorbed on the column along with the protactinium. It would be desirable to isolate the protactinium without these other radionuclides. An embodiment relates to the separating protactinium from these other radionuclides. This separation may be accomplished by extraction chromatography using an appropriate extraction chromatography resin. An exemplary resin suitable for separating protactinium from these other radionuclides is based on the extractant octylphenyl-N,N-di-isobutyl carbamoyl-phosphine oxide ("CMPO") dissolved in tri-n-butyl phosphate (TBP). The formula of the CMPO molecule is

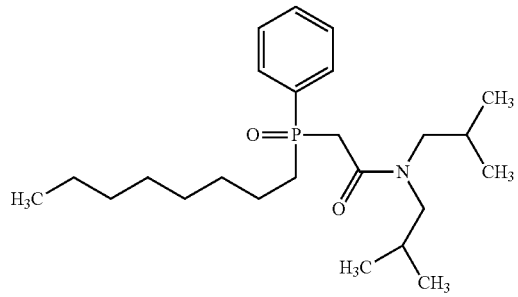 [SMILES: CCCCCCCCP(=O)(CC(=O)N(CC(C)C)CC(C)C)c1ccccc1]

Such a resin is commercially available under the name TRU resin. An embodiment relates to using TRU resin with a bed density approximately 0.37 g/mL and a working capacity of 2 mg of americium (Am) per mL of resin or 4 mg Am per 2 mL pre-packed column. This value represents 20% of the theoretical maximum loading capacity of the resin. A second resin appropriate for purifying the protactinium is based on diamylamylphosphonate (DAAP). This type of resin is also commercially available under the name UTEVA resin. In an embodiment using a column of TRU or UTEVA resin, protactinium may be selectively retained, while other tetra- and pentavalent ions of radionuclides including niobium, antimony, ruthenium and zirconium, are eluted.

If recovery of protactinium were not desired, then the aforementioned aspects regarding separation and purification of protactinium may be omitted.

If protactinium and actinium recovery were desired, then one could begin with the concentrated acidic target solution eluted from the column of strongly basic anion exchanger, use the strongly basic anion exchanger to remove protactinium (and other radionuclides), and begin the process of recovering actinium using the eluate which includes thorium and actinium. In either situation (i.e. with or without recovering protactinium), the majority of the radionuclides present in the strongly acidic solution prepared by dissolving the target in concentrated HCl with a small amount of added hexafluorosilicate are thorium radionuclides which are present as Th(IV). Soluble actinium would be present as actinium(III), soluble radium as radium(II), and the soluble radiolanthanides as Ln(III) (e.g. Ce(III), La(III)).

Recovery of actinium involves separating actinium from thorium, which is present as Th(IV). An embodiment may involve converting the soluble Th(IV) to soluble anionic complexes. This may be accomplished by using ligands suitable for forming anionic complexes with Th(IV). Selective complexation of thorium(IV) to form anionic complexes may involve the use of ligands that include but are not limited to citrate, tartrate, ethylenediaminetetraacetate, oxalate, malonate, or other suitable di-, tri-, and tetracarboxylates or the corresponding carboxylic acids. These ligands bind to Th(IV) to form soluble anionic (i.e. negatively charged) complexes. Most of the other soluble ions that remain in solution do not form anionic complexes with citrate, tartrate, or with any of the other carboxylic acids. These other soluble radionuclides remain cationic. An appropriate amount of the ligand would be added to complex the Th(IV). This amount would be based on the weight of the irradiated thorium target and the molecular weight of the ligand. The amount of the ligand would be determined by calculating a thorium-mass-stoichiometric amount of the carboxylic acid, whether it be citric acid, tartaric acid, ethylenediaminetetraacetic acid, oxalic acid, malonic acid, or some other suitable acid ligand. A solution of the desired acid ligand having a concentration of from about 0.1M to about 1M would be prepared. A solution of the residue of the target solution would be prepared. This solution would contain thorium, actinium, radium, etc. The pH of this solution would be adjusted to an acidic pH range of from about pH 1 to about pH 6, preferably pH between 2 to pH 3, using an aqueous ammonia or sodium hydroxide solution. This converts the thorium(IV) (and cerium(IV)) present in the solution, to anionic complexes of Th(IV) (and Ce(IV)).

In a particular embodiment, a target of proton-irradiated thorium metal is dissolved in concentrated HCl. The solution is evaporated to provide a residue. The residue is dissolved in a dilute citric acid solution having pH=2, resulting in quantitative complexation of thorium(IV) to soluble anionic complexes of thorium(IV). The solution of anionic complexes of Th(IV) is then passed through a column of a suitable solid-supported cation exchanger. The anionic complexes of thorium(IV) elute through the column of cationic exchanger. The cationic radionuclides retained on the cationic exchanger are those that did not form anionic complexes with the citrate (or tartrate of other suitable carboxylic acid or carboxylate materials). These cationic radionuclides include actinium(III), radium(II), (protactinium if not removed previously), and other cationic radiolanthanides, and cationic fission products.

Cationic exchangers suitable for eluting anionic complexes of thorium(IV) while retaining actinium(III) and radium(II) and protactinium(V) and other cationic radionuclides include, but are not limited to, resins having sulfonic acid functional groups attached to a styrene/divinylbenzene copolymer lattice. These cation exchanger types of resins are commercially available. Examples of such commercially available cation exchanger resins include those available under the names BIORAD AG50W type, BIORAD AG 50W×4 or AG50W×8, H+ form, BIORAD AG MP-50 macroporous resin, and DOWEX 50W×8, 200-400 mesh. These cationic exchange resins have sulfonic acid functional groups attached to a styrene/divinylbenzene copolymer lattice.

For a particular embodiment, BIORAD AG50W×8 resin, commercially cation exchanger resin available in the H$^+$ form, was converted to the NH$_4^+$ form by equilibration in an aqueous saturated solution of ammonium chloride (NH$_4$Cl) at pH 7.0. This resin was used to extract cations from a solution with a pH of at least 1 pH unit lower than the pKa of the analyte.

After removal of protactinium (using the strongly basic anion exchanger) and conversion of Th(IV) to cationic complexes and subsequent removal of the cationic complexes of Th(IV) using cation exchanger resin, soluble radionuclides that remain include those of radium, actinium, and radiolanthanides. These may be obtained selectively using various steps of evaporation, acidification, and elution using solid-supported extraction phases or extraction resins. Suitable extraction resins for separating radiolanthanides from cationic actinium radionuclides (present as Ac(III)), include a resin based on the extractant N,N,N',N'-tetra-n-octyldiglycolamide. This extractant is referred to herein as "TODGA/DGA NORMAL RESIN". Another extraction resin suitable for separating actinium (III) from radiolanthanides is based on the extractant N,N,N',N'-tetrakis-2-ethylhexyldiglycolamide, which is referred to herein as "TODGA/DGA BRANCHED RESIN". TODGA/DGA BRANCHED RESIN was used for separating actinium (III) from radiolanthanides. The formula for these extractants has the formula

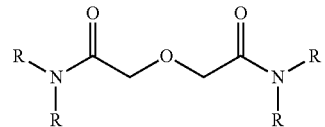

wherein R is an n-octyl group (i.e. —CH$_2$CH$_2$CH$_2$CH$_2$CH$_2$CH$_2$CH$_2$CH$_3$) for TODGA/DGA NORMAL RESIN or a 2-ethylhexyl group for TODGA/DGA BRANCHED RESIN. Resins of these extractants are commercially available from EICHROM Inc. Bed densities of these resins are approximately 0.38 g/ml, with a working capacity of 7.23 mg of strontium-90 per ml of resin and 11 mg of ytterbium per ml of resin. Another suitable extractant is di(2-ethylhexyl) orthophosphoric acid ("HDEHP"). A commercially available resin of HDEHP suitable for separating actinium (III) from radiolanthanides is EICHROME Ln resin, commercially available from EICHROM Inc.

Other solid-supported chromatographic extraction materials, either commercially available or manufactured, may be used as well. These materials may be comprised of extractants containing either nitrogen or phosphorus based functional groups for complex formation.

The separation of actinium from fission radiolanthanides is based on differences in complexation/chelation affinities of actinium versus lanthanides. Actinium(III) and lanthanide (III) possess different ionic hardness and thus exhibit different affinities towards phosphorus or nitrogen containing complexants.

In practice, the radiological purity and yield at various places during the process was determined. For example, after an elution through a resin, the radiological purity and separation yields of the eluate were determined by gamma ray spectroscopy using an ORTEC HPGe detector system and GAMMA VISION software. Spectra were analyzed by Los Alamos Laboratory Counting Room. Care was taken that the dead time of the detector was always below 10%. The data were normalized to the time point of the first acquisition. The detector was calibrated for efficiency at measured positions with a certified standard solution.

The separation yield and content of thorium in different eluted fractions were monitored by gamma spectroscopy of the thorium-227 (t$_{1/2}$=18.72 days) radioisotope, which was formed during proton irradiation. Radioactive decay of actinium-227 produces thorium-227 but the percentage formed by this pathway is negligible because the half-life of actinium-227 (21.773 years) is much longer than the separation time which is on the order of minutes.

After separating the thorium(IV) and cerium(IV), zirconium(IV), niobium(V), silver(I), ruthenium(VIII) and other group 4-12 transition and main group 1, 2 and 5-9 elements in the form of anions or soluble anionic carboxylate (citrate, for example) complexes, remaining on the column of the cation exchanger are the cationic radionuclides and cationic fission products as well as soluble cationic radium and soluble cationic lanthanides. The resin now may be washed with ammonium citrate solution or any other ammonium salt of a suitable chelating carboxylic acid for chelating the thorium(IV) in order to remove additional thorium(IV) from the column before eluting the other cationic species from the resin.

Having separated the thorium(IV), the cation exchange resin may be contacted with dilute $HNO_3$ having a concentration of from about 1 M to about 2M to elute cationic species including soluble cationic lead, soluble cationic cesium, soluble cationic strontium, soluble cationic barium, soluble cationic bismuth, and soluble cationic radium.

Having removed the aforementioned cationic radionuclides, the resin may now contacted with $HNO_3$ having a concentration of from about 4M to about 6M, typically 6M. This step of contacting the resin with concentrated $HNO_3$ results in elution of soluble cationic actinium(III) and soluble cationic lanthanides, At this point, a suitable extraction chromatography resin may be used for the further separation of actinium and radiolanthanides. In an embodiment, TODGA/DGA NORMAL RESIN was used. The liquid eluted from the cation exchanger column loaded onto a column prepared from a small amount (perhaps about 1 gram to about 2 grams) of TODGA/DGA NORMAL RESIN. The actinium(III) eluted from the column using nitric acid (from about 6M to about 10M, preferably 10M) to produce the eluate. The radiolanthanide cations were retained. Additional actinium was obtained by washing the resin with several (perhaps 5 to 8) small (perhaps 1 mL each) increments of $HNO_3$ (about 6M to about 10M, preferably 10 M).

Having recovered the actinium(III) radionuclides, which included actinium-224, actinium-225, actinium-226, and actinium-227, the combined eluates of actinium(III) were evaporated to dryness and redissolved in a relatively dilute (perhaps 0.1M) hydrochloric solution for end-user applications.

EICHROM-LN resin may be used to separate actinium from radiolanthanides. The liquid eluted from the cation exchanger, which contains soluble cationic actinium(III) and soluble cationic lanthanides, may be evaporated to dryness to form a residue. The residue may be redissolved in a small amount (perhaps 5 mL) of aqueous hydrochloric acid having a concentration of from about 0.1 M to about 0.9M. The resulting solution of soluble actinium(III) and soluble cationic lanthanides may then be eluted through a column containing a small amount (perhaps about 1 gram to about 2 grams) of EICHROM-LN resin. This resin will separate the actinium(III) from most of the radiolanthanides. The resin may also remove residual complexant (e.g. citrate). The liquid suitable for eluting the actinium(III) is a relatively dilute solution of HCl (0.1M to 0.9M). The actinium (III) elutes first. Afterward, the resin is contacted with a more concentrated HCl solution (from about 1M to about 8 M) to remove lanthanide(III) cations. The eluted solution of actinium(III) may be evaporated to dryness to produce a residue that may be redissolved in a relatively dilute (perhaps 0.1M) of hydrochloric solution for end-user applications.

Details about Thorium Targets.

Thorium metal targets herein were greater than 99% pure as measured by X-ray fluorescence spectroscopy. The targets were manufactured at the Los Alamos National Laboratory (LANL). Small chunks of Th metal of this purity were first melted, cooled, and then rolled into sheets with a mean thickness of 0.50±0.02 mm. From this sheet stock, target pieces were cut and then encapsulated in INCONEL holders suitable for irradiation in a proton beam.

The targets were subjected to gamma-ray spectrometry using an EG&G ORTEC Model GMX-35200-S HPGe detector system in combination with a Canberra Model 35-Plus multichannel analyzer. The diameter of the detector diameter was 50.0 mm. The detector length was 515 mm. The beryllium (Be) window thickness was 0.5 mm. The outer dead-layer thickness was 0.3 μm. Standards were used to evaluate and determine the response of the detector. These standards were radionuclide mixtures that included $^{241}$Am, $^{109}$Cd, $^{57}$Co, $^{139}$Ce, $^{203}$Hg, $^{113}$Sn, $^{137}$Cs, $^{88}$Y, and $^{60}$Co. The standards are traceable to the National Institute of Standards and Technology (NIST) and were supplied by Eckert & Ziegler, Atlanta, Ga., USA. The detector was a p-type Al-windowed HPGe detector with a measured FWHM at 1333 keV of approximately 2.2 keV and a relative efficiency of about 10%. Relative total source activity uncertainties ranged from 2.6% to 3.3%. Counting dead time was kept below 10%.

Targets were irradiated at the Isotope Production Facility (IPF), Los Alamos National Laboratory (LANL), NM, USA. The incident energy of the proton beam in front of a target was approximately 92 MeV. The target was subjected first to a beam intensity of 150 μA for one hour and then the beam intensity was raised to 230 μA and the target was irradiated for another hour. Afterward, the now irradiated target was transported to the LANL Hot Cell Facility for chemical processing.

The total mass of the Th metal target used for demonstrating the present process was 10.40±0.02 g. Solutions of the irradiated thorium target were prepared approximately eleven months after the end of bombardment (EOB) to reduce emission from the target to a sufficiently low dose rate so the irradiated target could be processed in a radiological fume hood.

Chemicals.

The chemicals used for processing the irradiated thorium metal targets were used as purchased. Nitric acid ($HNO_3$) and hydrochloric acid (HCl), both Optima grade, were purchased from Fisher Scientific (Pittsburgh, Pa., USA). Oxalic acid (99.9%) was obtained from Sigma Aldrich (St Louis, Mo., US), and deionized water (18 MΩ/cm) was prepared with a Millipore filtration device. Strongly basic anion exchanger resin AG 1×8, 200-400 mesh, was obtained from BIORAD (Hercules, Calif., USA). Extraction chromatography resins referred to herein as "TRU" (octylphenyl-N,N-di-isobutyl carbamoylphosphine oxide, 100-150 μm) and "UTEVA" (dipentylpentylphosphonate, 100-150 μm) were purchased from EICHROM INC. (Lisle, Ill., USA). Aqueous solutions, including but not limited to the solution of ammonium hexafluorosilicate, were prepared using deionized water (18 MΩ/cm).

Additional Comments about Chromatography and Spectroscopy.

The bulk of the metal ions of the solution prepared by dissolving the proton-irradiated thorium metal target are those of the target metal, i.e. thorium. After selecting which radionuclides are desirable, the problem becomes separating those desirable radionuclides from the rest of the radionuclides present in the acid solution. This aspect of the process has been demonstrated using various types of chromatography. In particular, anion exchange chromatography, cation exchange chromatography, and extraction chromatography are used to separate radioisotopes from acidic solutions of the irradiated target. Anion exchange chromatography and cation exchange chromatography are suitable for the process because various soluble cationic and anionic species of the radionuclides are present in the acid solution formed from the irradiated target, and these species are differentially attracted to charged sites of solid-supported anion exchanger and cation exchanger phases. These charged sites are attached to a polymer backbone, and they attract ions of the opposite charge. These phases may be inorganic or organic in nature.

Inorganic cationic exchangers and organic cation exchangers use large chain-like or lattice-like molecules or structures to support the charged sites. Examples of inorganic exchangers include but are not limited to hydrous metal oxides (e.g., silicon oxide, hydrous ferric oxide, manganese oxide, tin oxide, antimony oxide, titanium oxide) and synthetic hydroxyapatites. Examples of organic cation exchangers include but are not limited to resins in which the support comprises an organic polymer including but not limited to polystyrene.

Solid-supported extraction chromatography (EXC) is a technique suitable for separating radionuclides from one another. Extraction chromatography combines the selectivity of liquid-liquid extraction with the ease of operation of column chromatography. Extraction chromatography requires: (1) an inert support, (2) a stationary phase, and (3) a mobile phase. Typical inert support materials include particles of porous silica or beads of an organic polymer. Particle/bead sizes typically are in a range of 50 to 150 micrometers ("μm") in diameter, although smaller or larger particles can also be used. The stationary phase is typically a liquid extractant that can be a single compound or a mixture. Diluents can also be used to solubilize the extractant and increase the hydrophobicity of the stationary phase. The mobile phase is usually a solution of an acid such as hydrochloric acid or nitric acid. Complexants such as oxalic or hydrofluoric acids may be used to enhance selectivities or the stripping of strongly retained metal ions from columns.

Separating the dissolved Pa from the bulk of the dissolved target (i.e. the dissolved thorium) involves using anion exchange chromatography acid solutions to elute the radionuclides. The dissolved Pa is retained along with other radionuclides during anion exchange chromatography. These other radionuclides may be removed from Pa using solid-phase extraction chromatography.

Inductively Coupled Plasma Atomic Emission Spectroscopy ("ICP-AES") was used to determine thorium content throughout the process, A Shimadzu ICPE-9000 instrument equipped with a 2 cm×2 cm CCD detector calibrated on the day of use was employed. Calibration solutions were prepared from certified stocks. The qualitative measurement method was based on calibrating the response of the instrument to known concentrations of Al and Ba. Analyses were based on a 30 second sample exposure time and were performed in triplicate. Output data were managed and analyzed using the ICPE Solutions software version 1.01 (2005) available from the SHIMADZU Corporation.

The chemical separation was monitored during the chromatography. Several radioisotopes were identified to function as representatives of an element. Some radioisotopes (e.g. thorium-227, actinium-225, radium-223) were added as spikes prior to chemical separation because they could no longer be detected in the target material by the time of the separation. Table 1 shows some the radionuclides present in the target or added as spikes, along with their γ-ray emission energies and abundances.

TABLE 1

| Element (valence) | Radioisotope | Half-life [days] | Detected γ-ray energy [keV] | γ-ray Abundance [%] |
|---|---|---|---|---|
| Pa(V) | $^{233}$Pa | 26.98 | 311.9 | 38.5 |
| Nb(V) | $^{95}$Nb | 34.99 | 765.8 | 99.8 |
| Th(IV) | $^{227}$Th(spike) | 18.68 | 235.9 | 12.9 |
| Ru(IV) | $^{103}$Ru | 39.25 | 497.1 | 91.0 |
| Zr(IV) | $^{95}$Zr | 64.03 | 756.7 | 54.4 |
| Sb(III, V) | $^{125}$Sb | 1007.4 | 427.8 | 29.6 |
| Ce(III, IV) | $^{140}$Ce | 32.5 | 145.4 | 48.3 |
| Ac(III) | $^{225}$Ac(spiked) | 10.0 | 99.8 | 1.0 |
| Ra(II) | $^{223}$Ra(spiked) | 11.4 | 269.4 | 13.9 |

A sequence of chromatographic separations was developed to (1) separate Pa from Th, (2) separate Pa from other radionuclides besides Th, (3) separate Ac from Th, (4) separate Ac from other radionuclides besides Th (5) separate Ra from Th, and (6) separate Ra from other radionuclides besides Th.

The Pa was separated from the Th by anion exchange in hydrochloric acid media. The separated Pa was purified further using a solid phase extraction chromatography resin (either TRU or UTEVA).

Example 1: Separation of Protactinium from the Irradiated Thorium Metal Target

Figure 3:
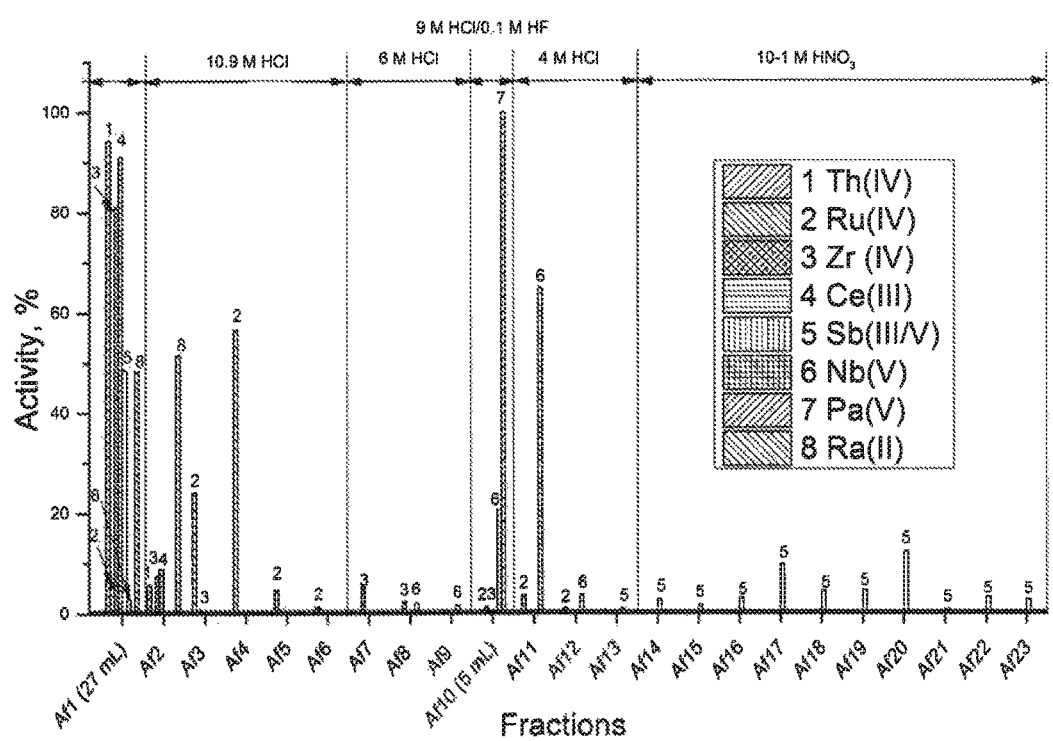
FIG. 3 shows an elution profile for radionuclides eluted from a column of a strongly basic anion exchanger resin. The individual peaks are numbered according to the radionuclides that they represent as follows: 1=thorium(IV); 2=ruthenium(IV); 3-zirconium(IV); 4=cerium(III); 5=antimony(III) and antimony(V); 6=niobium(V); and 7=radium (II).

The thorium metal target was irradiated as previously described. An aliquot (0.50±0.05 grams) of the proton-irradiated target was placed in a Teflon beaker. Hydrochloric acid (25 mL of 12M HCl) was added to the beaker. Enough ammonium hexafluorosilicate ("NH$_4$SiF$_6$") was added to provide a final hexafluorosilicate concentration of approximately 0.05M. The ammonium hexafluorosilicate and acid present in solution are in equilibrium with a smaller concentration of hydrofluoric acid ("HF") which acts on the target by dissolving surface oxide layers from the target. The resulting mixture was spiked with 0.5 milliliters of a 0.1 M solution of Ac-225 and Th-227. Complete dissolution took about 30 minutes. Afterward, the resulting solution was filtered through a small plastic frit. The filtrate (total volume=27 milliliters) was loaded directly on a column of anion exchanger resin (1.8 milliliters, AG1×8, 200-400 mesh, Cl$^-$ form). The effluent was collected in vials. Multiple fractions were eluted from the column. The first six fractions (f1, f2, f3, f4, f5, f6) of eluate were obtained after adding 10 milliliter amounts of 10.9 M HCl sequentially to the column. These first six fractions contained thorium and other no-carrier-added fission products. The next three fractions (f7, f8, f9) were obtained after adding 6M HCl in 10 milliliter amounts to the column. These three fractions included zirconium. The tenth fraction (f10) was obtained after adding 5 mL of a dilute solution of HF in HCl to the column (in this embodiment, this solution was 0.1 M in HF and 9 M in HCl). Fraction f10 included the protactinium. The next three fractions (f11, f12, 13) were 10 milliliters each, and included Nb(V). Elutions with HNO$_3$ (10×10 milliliters) of varying concentrations followed in order to elute Sb(III) and Sb(V). FIG. 3 shows an elution profile for radionuclides eluted from a column of a strongly basic anion exchanger resin. The individual peaks are numbered according to the radionuclides that they represent as follows: 1=thorium(IV); 2=ruthenium(IV); 3-zirconium(IV); 4=cerium(III); 5=antimony(III) and antimony(V); 6=niobium(V); and 7=radium(II). As FIG. 3 shows, the loading fraction (f1) contained most of the thorium (more than 90%), about 81% of Zr(IV), 91.1% of Ce(III/IV), 48% of Ra(II), 48.5% of Sb(III/V) and <5% of Ru(IV) and Nb (V) isotopes. Actinium also follows thorium, and f1 and f2 contained ≥99% of the actinium-225. Pa(V) was quantitatively retained on the anion exchanger column. Further elution of the column with 10.9 M HCl allowed for the removal of residual thorium as well as Ce(III/IV) and Ra(II). Further elution with 6 M HCl allowed for the removal of Zr(IV) (more than 98%). Complete elution of Pa(V) was achieved with 9M HCl/0.1 M HF (f10), but this fraction also contained approximately 20% of the total activity of Nb(V) as well as 0.77% of the activity of Ru(IV) and 1.4% of the activity of Zr(IV). Further elution with 4 M HCl resulted in removal of residual Nb(V) and Ru(IV) while 50% of Sb (presumably in 5+ oxidation state) still remained on the column with less than 1% of the activity for Nb(V). In order to elute Sb(V), a gradient elution with $HNO_3$ was performed to elute 31% of the total antimony activity. The balance of the Sb activity remained sorbed on the resin.

Figure 4:
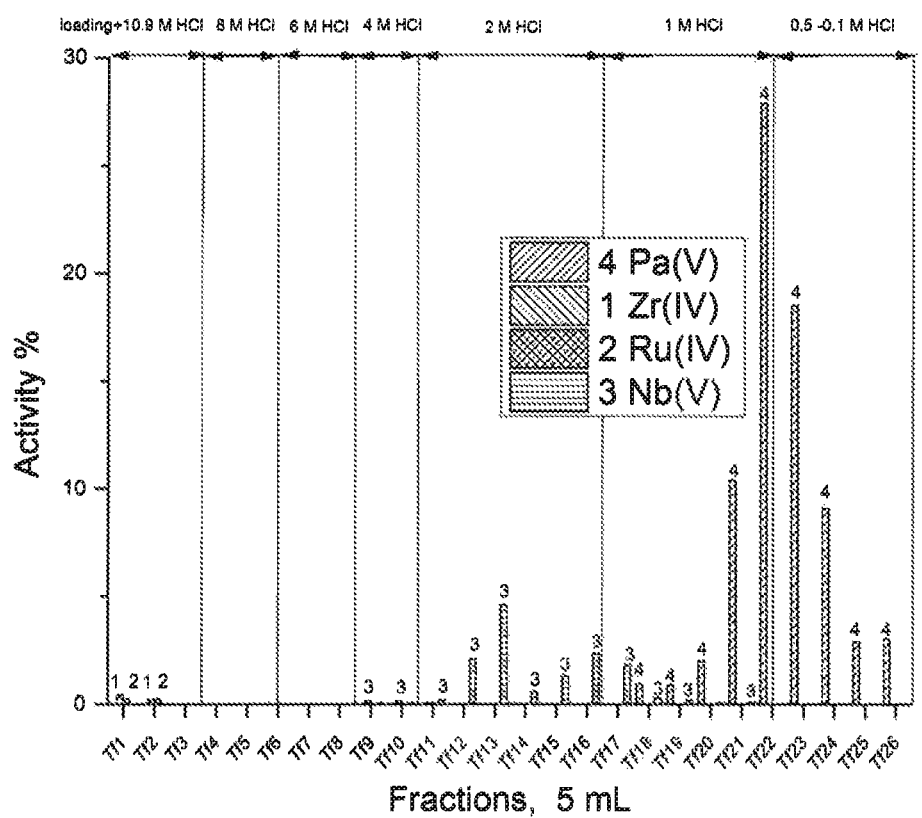
FIG. 4 shows an elution profile for radionuclides eluted from a column of TRU resin in HCl media. The individual peaks are numbered according to the radionuclides that they represent as follows: 1=zirconium(IV); 2=ruthenium(IV); 3=niobium(V); and 4=protactinium(V).

The protactinium-containing fraction, i.e. f10, was purified further using a column of 1 milliliter of TRU resin (100-150 µm mesh size) without resin preconditioning. The f10 fraction was loaded directly onto this column. Elution proceeded using 5 mL increments of HCl of varying concentrations as follows: (1) 2×5 milliliters of 10.9 M HCl (f1, f2) for zirconium and ruthenium removal; (2) 2×5 milliliters of 8 M HCl (f3, f4); (3) 3×5 milliliters of 6 M HCl (f5, f6, f7); (4) 2×5 milliliters of 4 M HCl (f8, f9); (5) 6×5 milliliters of 2 M HCl (f10, f11, f12, f13, f14, f15) for niobium elution; (6) 6×5 milliliters of 1 M HCl (f16, f17, f18, f19, f20, f21); (7) 4×5 milliliters of 0.2 M HCl (f22, f23, f24, f25); (8) 2×5 milliliters of 0.1 M HCl (f26, f27) for the elution of Pa(V). FIG. 4 shows the elution profile using TRU resin column. The individual peaks are numbered according to the radionuclides that they represent as follows: 1=zirconium(IV); 2=ruthenium(IV); 3=niobium(V); and 4=protactinium(V). As FIG. 4 shows, Pa (V) and Nb(V) were retained on the resin, while Ru(IV) and Zr(IV) partially eluted. Residual Ru(IV) was further eluted with 10.9 M HCl (2×5 milliliters). Zirconium (IV) was then eluted with 4 and 2 M HCl, and Nb(V) was eluted with 2 and 1 M HCl. However, at a concentration of 1 M HCl, a portion of Pa(V) was co-eluted as well. Subsequently, Pa(V) was eluted with 0.5 and 0.1 M HCl. After contact with 0.1 M HCl (2×5 milliliters), a significant amount of Pa(V), still remained on the column. In order to elute this residual activity, a rather large volume may be required (exceeding 100 milliliters).

An ICP-AES analysis of final Pa fraction was performed that resulted in an absolute Th content that was below the detection limit, i.e., a thorium-232 mass of 50 micrograms ("µg") in the measuring sample, corresponding to a Th decontamination factor of $\geq 10^8$.

After the elutions, the column of TRU resin was subjected to γ-ray spectrometry to ascertain quantitative removal of radioactivity.

Example 2: Separation of Protactinium from the Irradiated Thorium Metal Target

Figure 5:
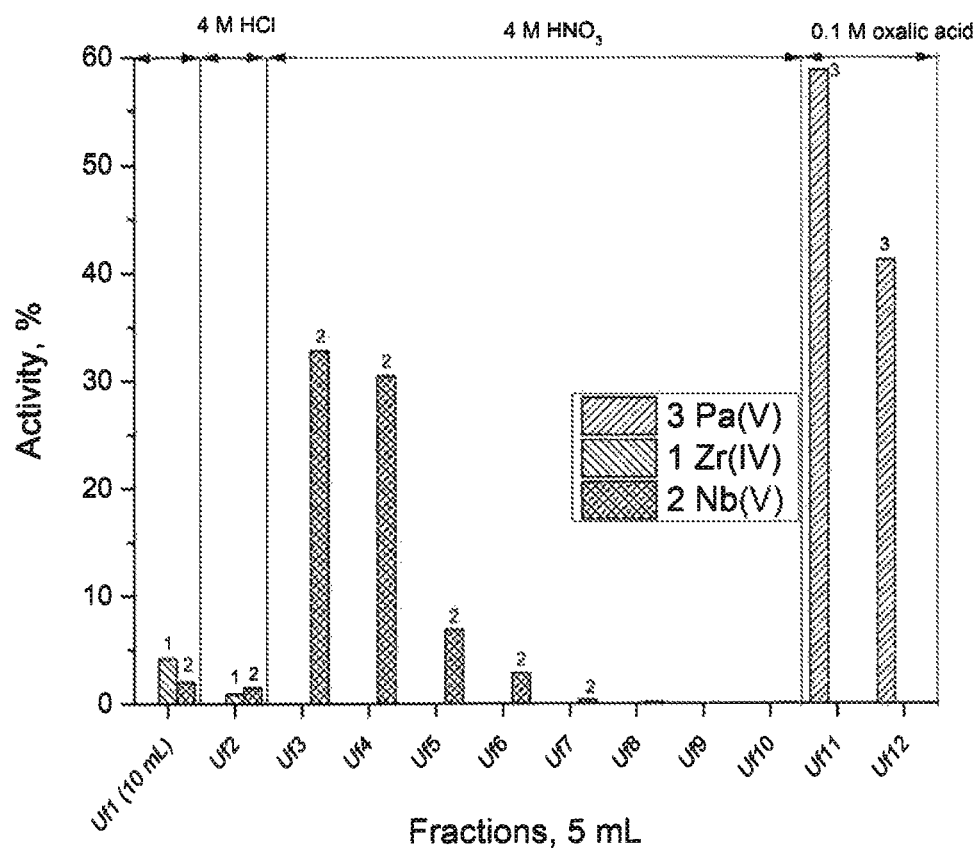
FIG. 5 shows an elution profile for radionuclides eluted from a column of UTEVA resin in acid media. The individual peaks are numbered according to the radionuclides that they represent as follows: 1=zirconium(IV); 2=niobium (V); and 3=protactinium(V).

A second aliquot (0.5±0.05 grams) of the irradiated target of thorium metal was placed in a Teflon beaker. 12 M HCl (25 milliliters) was added to the beaker, along with enough ammonium hexafluorosilicate to provide a final hexafluorosilicate concentration of 0.05M. This mixture was spiked with 0.5 milliliters of a 0.1 M solution of Ac-225 and Th-227. Complete dissolution took about 30 minutes. Afterward, the resulting solution was filtered through a small plastic frit. The filtrate (total volume=27 milliliters) was loaded directly on a column of anion exchanger resin (1.8 $cm^3$, AG1×8, 200-400 mesh, $Cl^-$ form). The effluent was collected in vials. Multiple fractions were eluted from the column. FIG. 5 shows the elution profile using the UTEVA resin. The individual peaks are numbered according to the radionuclides that they represent as follows: 1=zirconium (IV); 2=niobium(V); and 3=protactinium(V). The first six fractions (f1, f2, f3, f4, f5, f6) of eluate were 10 milliliters each and were obtained after adding 10 milliliter increments of 10.9 M HCl to the column. These fractions included thorium and other no-carrier-added fission products. The next three fractions (f7, f8, f9) were also 10 milliliters each were obtained after adding 10 milliliter increments of 6M HCl to the column. These three fractions included zirconium. Thus, the procedure to this point is the same for obtaining the first nine fractions from the first aliquot of the target. In this embodiment, fraction f10, which contained the protactinium(V), was obtained by adding 10 mL of 4 M HCl to the column. This was followed by further HCl and $HNO_3$ increments as set forth as previously described. After elution of all radionuclides, the anion exchanger column was subjected to γ-ray spectrometry to ascertain quantitative removal of radioactivity. The f10 fraction obtained from this second aliquot was loaded directly on a column of UTEVA resin. When the UTEVA resin column was preconditioned as previously described (i.e. with 0.1 HF, 9M HCl) no radionuclide sorption on the UTEVA resin was observed. Therefore, the protactinium was eluted with 4 M HCl. Thus, after loading this f10 fraction (10 milliliters) directly on UTEVA resin column (1.5 mL, 100-150 µm), the elution proceeded as follows: (1) 1×5 milliliters of 4 M HCl (f2), (2) 4×10 milliliters of 4 M $HNO_3$ (f3, f4, f5, f6, f7) in order to remove Nb(V) and Zr(IV) traces. Finally, Pa (V) was eluted with 1×10 milliliters of 0.1 M oxalic acid.

Example 3: Separation of Nb(V) from Pa(V)

Figure 6:
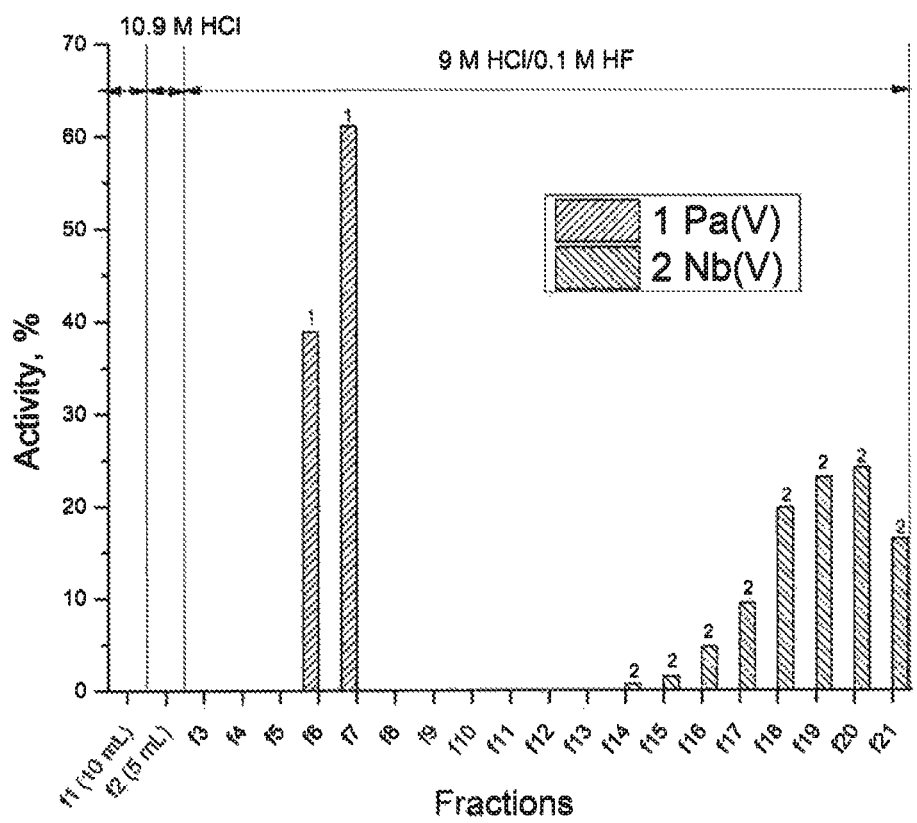
FIG. 6 shows an elution profile of Pa(V) and Nb(V) from a column of a strongly basic anion exchanger resin using 9 M HCl/0.1 M HF for the elution. The volumes of individual fractions f3 through f21 are 0.5 milliliter. The individual peaks are numbered according to the radionuclides that they represent as follows: 1=protactinium(V); and 2=niobium (V).

Nb(V) present in the Pa(V) fraction may be separated from the Pa(V) using an anion exchanger resin and small increments of eluent. Fractions f24 with prior f11 in 10 milliliters of 10.9 HCl were combined to provide a solution containing both Pa(V) and Nb(V). A similarly sized column of anion exchanger resin (1.8 $cm^3$, AG1×8, 200-400 mesh, $Cl^-$ form) was prepared and preconditioned with a solution of 9M HCl/0.1M HF. The solution of f11 and f24 in HCl was loaded onto the column. Niobium (V) and Pa(V) were quantitatively retained on the anion exchanger resin during the initial loading step. No breakthrough was detected after washing the resin with 5 milliliters of 10.9 M HCl. The solution of 9 M HCl/0.1 M HF was passed through the column. FIG. 6 shows the elution profile. The individual peaks are numbered according to the radionuclides that they represent as follows: 1=protactinium(V); and 2=niobium (V). Fractions of 0.5 milliliters in volume were collected to assess the separation of Pa(V) and Nb(V). Fractions f6 and f7 (2×1 mL) contained greater than 99% of the sorbed Pa(V). An additional 3×1 mL of a solution of the HCl/HF acid was further passed through the resin column until Nb(V) activity was starting to be detected. No Pa(V) was detected in fractions other than f6 and f7, nor was there any Pa left on the resin column. It was apparent that smaller elution fractions significantly enhanced the separation of Pa(V) and Nb(V) in this anion exchanger chromatography system. The content of Th in the Pa(V) fractions as eluted from anion exchanger column was determined via (1) ICP-AES and (2) $^{227}$Th tracer spiking prior to column chromatography. Both approaches demonstrated a Th decontamination factor of $\geq 10^3$.

Oxalic acid was used to elute the f10 fraction with UTEVA resin. ICP-AES analysis was problematic due to this oxalic acid content. In this case, a 3 hour long γ-ray spectrometric measurement was conducted to determine thorium-227 tracer content. No thorium-227 activity was detected, corresponding to a decontamination factor of $\geq 10^7$.

The UTEVA resin separation embodiment provided greater than 98% elution amounts of Pa(V) in 10 mL of a 0.1 M oxalic acid matrix. The TRU resin separation embodiment purification provided 76% of the Pa(V) in a matrix 50 mL of low molar HCl. The main detectable contaminant in the final Pa(V) fraction was Nb(V), which present as niobium-95. Nb(V) was not detected in the Pa(V) fraction that eluted from the TRU resin column. The Pa fraction eluted from the UTEVA resin also contained approximately 0.1% of the total Nb(V) activity. Other contamination levels were successfully reduced below detection limits via the two-step anion exchange—extraction chromatography sequence described above.

Example 4: Separation of Actinium from Proton-Irradiated Thorium Target

Figure 7:
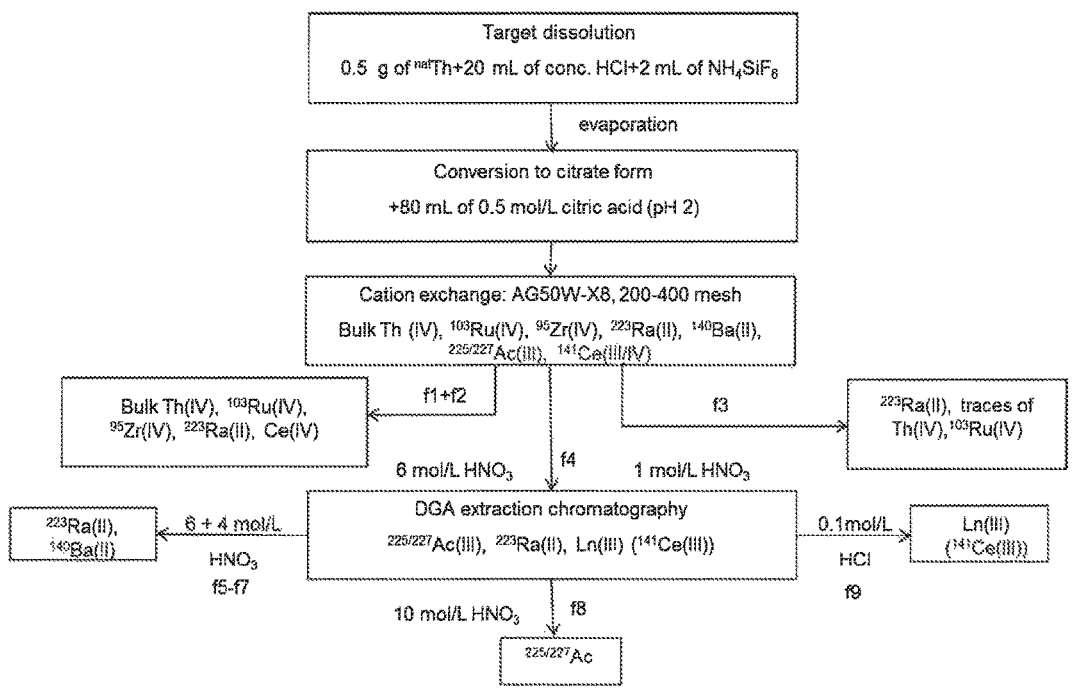
FIG. 7 is a block flow diagram for an embodiment process for separating actinium-225/actinium-227 from an irradiated thorium metal target.

FIG. 7 shows a schematic block diagram for separating actinium form the proton-irradiated target. FIG. 7 complements and supplements the detailed description below. A small portion (533 milligrams) of the irradiated Th target was placed in a Teflon beaker. Concentrated HCl (12 M) and ammonium hexafluorosilicate (2 mL of a 0.05 mol/L solution) were added to the beaker. A spike of 0.5 mL of actinium-225 in 0.1 M HCl was also added. After complete dissolution, the resulting solution was filtered through a fritted funnel, and then evaporated to dryness on a hot plate with a surface temperature maintained at below 150° C. The residue was redissolved in 22 mL of 15.4 M $HNO_3$ for the oxidation of cerium isotopes from Ce(III) to Ce(IV). The mixture was then evaporated again to dryness on a hot plate with a surface temperature maintained below 150° C. The residue was dissolved in 0.5 M citric acid solution. The pH of the citric acid solution was adjusted to pH=2 with using a concentration solution of ammonia to give a final solution volume of 75 milliliters.

Cation exchanger resin (AG 50×8, 200-400 mesh, H+ form, 1.5 mL) was placed into a plastic column (10 mL capacity; column dimensions 1.0 cm×3.1 cm). The resin was converted to the $NH_4^+$ form using 20 mL of a saturated solution of $NH_4Cl$. The resin was then preconditioned with 20 milliliters of 0.5 M citric acid (pH=2). The target solution (75 milliliters) was loaded onto the column. The effluent was collected and analyzed via γ-ray spectroscopy (fraction 1 (f1)). The column was washed with 20 milliliters of ammonium citrate (0.5 M, pH=2, fraction 2), and then eluted successively with 5 mL of 1 M $HNO_3$ (which generated fraction 3), and 20 milliliters of 6 M $HNO_3$ (which generated fraction 4). The eluted fractions were analyzed by γ-ray spectroscopy.

DGA branched resin (1.0 mL) was placed into a plastic column (column dimensions 1 cm×2.1 cm, column capacity 10 mL) and then preconditioned with 10 mL water and 5 mL of 6 M $HNO_3$. Fraction 4 from the previous elution was loaded directly onto the column of DGA branched resin. The column was washed with 2×5 mL of 4 M $HNO_3$, generating fractions 6 and 7 which contained the radium isotopes. Afterward, the column was washed with 15 mL of 10 M $HNO_3$, generating fraction 8 which contained actinium. The column was finally washed with 10 mL of 0.1 M HCl, generating fraction 9 which contained radiolanthanides.

Fraction 1 contained most (≥98±5%) of the soluble thorium most (≥98±5%) of the total activities of fission nuclides ruthenium-103 ($t\frac{1}{2}$=39.25 days) and zirconium-95 ($t\frac{1}{2}$=64.03 days), which were the main source of the γ-ray dose rates prior to separation. Thorium was quantitatively removed from the column of cation exchanger by additional washes of 0.5 M citric acid (20 milliliters, fraction 2). After washing with citric acid, neither thorium-227 nor zirconium-95 was detected on the exchanger column. These washes also did not contain any detectable actinium-225 or actinium-227. Elution with 1 M $HNO_3$ (fraction 3) resulted in removal of residual ruthenium-103 and radium-223 ($t_{1/2}$=11.43 days).

Cerium-141 was the only radiolanthanide detected 60 days after end-of-bombardment. Cerium(III) was partially oxidized to cerium(IV) so that it could be eluted with soluble thorium. Cerium (III) eluted alongside actinium(III) in fraction 4 using 20 mL of 6 M $HNO_3$). Most of the radium-223 activity was present in fraction 1 (≥85%); a smaller amount (≥5%) was present in fraction 2. Fraction 3 contained less than 1% of the total activity of radium.

Fraction 4 included greater than 99% of the actinium activity (actinium-225 and actinium-227). Neither thorium radionuclides nor ruthenium-103 nor zirconium-95 were detected in fraction 4. Major impurities in fraction 4 were radium-223 (with its decay products), cerium-141 ($t\frac{1}{2}$=32.5 days) and barium-140 ($t\frac{1}{2}$=12.75 days).

Fraction 4, after cation exchange, was subjected to further purification by cation exchange column chromatography. Without any reconstitution (i.e. evaporation and dissolution) of fraction 4, or resin preconditioning, fraction 4 was loaded directly onto a column of DGA resin. Elution with 6 M $HNO_3$ produced fraction 5, which contained ≥90% of the radium-223 activity and ≥barium-140; actinium-225 and cerium-141 were quantitatively retained on the resin. Residual radium-223 and barium-140 were further removed by elution with 5 mL of 4 M $HNO_3$; the effluent was fraction 6. An additional rinse (fraction 7) showed no activity.

More than 99% of the actinium retained on the resin was subsequently eluted with 15 mL of 10 M $HNO_3$) as fraction 8, which is a recovery of ≥98% of the original spike of actinium-225 added after dissolving the irradiated thorium target.

Cerium-141 was retained on the extraction chromatography column. Published reports indicate that La(III) should behave similarly, and heavier lanthanides should be sorbed even more strongly. Cerium-141 was eluted from the resin using 10 mL of 0.1 M HCl; the effluent was fraction 9 (f9).

The actinium fraction (fraction 8) was evaporated to dryness and then reconstituted with 5 mL of 0.1 M $HNO_3$ for evaluation of product radionuclidic and radiochemical purity.

Example 4 provides an embodiment process for separating actinium from a proton beam irradiated target of thorium. The process involves separating actinium from the dissolved thorium matrix solution and subsequent purification from the majority of activation by-products by cation exchange chromatography. Cerium is the only detected radiolanthanide; cerium partly follows thorium (as Ce(IV) and partly accompanies actinium (as Ce(III)). Actinium is finally separated and purified from residual dispositive elements and tri-positive radiolanthanides (as represented by a Ce(III) radiolanthanide) via DGA resin extraction chromatography. For the cation exchange chromatography part, citric acid at pH=2 was chosen because it forms anionic chelation complexes with most tetra-positive (4+) cations, while tri-positive (3+) cations remain positively charged.

Under these conditions, Ac(III) is quantitatively retained on the cation exchanger resin while the anionic Th(IV) citrate complex elutes. Furthermore, most anionic transition metal species such as ruthenium-103 and zirconium-95 elute alongside the Th(IV). Removal of these elements facilitates a purified solution substantially free of the majority of fission products and γ-ray emitting radionuclides.

Irradiation of thorium targets with protons generates a variety of radionuclides including protactinium. The protactinium was separated from the thorium target by forming a strongly acidic solution of the target under conditions that permitted separation of the protactinium by sorption on a strongly basic anion exchange resin followed by purification using an extraction chromatography resin. The acidic solutions are relatively simple to prepare. Chromatography has the advantage of being is a relatively simple separation technique. The resins suitable for the chromatography have the advantage of being.

Another advantage of the present process is that the protactinium is separated easily from the bulk of the irradiated target, i.e. thorium using a suitably concentrated HCl solution, which reacts with the protactinium to generate anionic chloro complexes but does not react with the thorium to produce similar complexes.

Another advantage of the present process is that a solution of the target can be directly loaded on the anion exchange column without any preconditioning or reconstitution of matrices. There is no need for liquid-liquid extraction.

Once the bulk thorium mass is removed, other contaminants can be removed as well, e.g. Zr(IV) by washing with 6 M HCl. The Pa may be desorbed and then subjected to extraction chromatography using a solution of 9 M HCl/0.1 M HF, which we have shown results in greater than 99% of the Pa desorbing in a volume of 5 mL, but desorbed with the Pa include 20% of Nb(V), 1% of Zr(IV) and 0.5% of the total Ru(IV) activity. Perhaps more advantageous is desorption using 4 M HCl as this desorption matrix, which results in greater than 99% of the Pa eluted in 10 mL of volume along with 69% of Nb(V) and 5% of the total Zr(IV) activity; further purification TRU resin resulted in near quantitative removal of Zr(IV) and Ru(IV) contaminants by concentration gradient elution with HCl. Most of the Ru(IV) was not sorbed on the column during initial loading, and washing with 10.9 M HCl removed residual Ru(IV). Effective Zr removal was achieved via washing with 4 and 2 M HCl, and Nb(V) was subsequently eluted with 2 M HCl and 1 M HCl. The 1 M HCl elutions, however, also desorbed some of the Pa(V) activity. The bulk amount of protactinium could then be eluted with HCl of lower (<1) molarity. Quantitative Pa elution was not possible in HCl media, and about 25% of the total Pa activity still remained sorbed on the column even after contact with 20 mL of 0.5 M HCl and 25 mL of 0.1 M HCl.

In another embodiment, Pa was eluted from the anion exchanger column with 4 M HCl (10 mL) and then directly loaded on a UTEVA resin column. This loading fraction contained more than 70% of the total Nb(V) activity and 5.4% of Zr(IV), while no Ru(IV) contamination was detected. After initial sample loading, the UTEVA column was washed with an additional volume of 4 M HCl (1×5 mL) to remove residual Zr(IV). Further elutions using 7×5 mL of 4 M HNO$_3$ resulted in desorption of greater than 95% of the total Nb(V) activity from the UTEVA resin. Protactinium was nearly quantitatively eluted with 0.1 M oxalic acid (1×10 mL), with only traces of Nb (≤1%) present in the final Pa fraction. Niobium(V) was the single radionuclidic impurity detected in the final sample of Pa eluted from the UTEVA resin. In order to decrease this Nb contamination, the Nb/Pa separation factor in the receding anion exchanger system was increased prior to UTEVA chromatography. With the reported knowledge that the sorption of Nb and Pa on anion exchangers differ in 9 M HCl/0.1 M HF media, tracers of Nb and Pa were loaded on an anion exchanger column and their elution profile was studied with a 9 M HCl/0.1 M HF eluent using smaller (0.5 mL volume) elution fractions. At least 99% of the total Pa activity was eluted within the first 2.5 mL of eluent. Detectable traces of Nb only desorbed after 6 mL of total eluent volume. This is a promising result toward the goal of separating the Nb contaminant from Pa using only anion exchange chromatography without any subsequent extraction chromatography. The application of anion exchange in combination with TRU resin extraction chromatography thus may be used for protactinium recovery and Nb(V) decontamination.

Protactinium-230 as a Source of Uranium-230.

Protactinium-230 ($t_{1/2}$ 17.4 days) is a source of the α-emitters uranium-230 ($t_{1/2}$ 20.8 days) and thorium-226 ($t_{1/2}$ 31 min). Sorption of protactinium-230 on TRU resin (or on another suitable resin), followed by elution of the decay products from the resin may be used to make these radionuclides available to a clinician. Protactinium-230 also decays to thorium-230 (91.6%), which would lower the specific activity of any eluted thorium-226. Such a system would not be expected to long lasting due to the following: (1) TRU resin has a relatively low sorption affinity for both Pa(V) and U(VI) is relatively low, and (2) the known washout of extragent from the resin solid.

Another approach involves the sorption of decay product uranium-230 and the repeated elution after of thorium-226 daughter in-growth, i.e., a $^{230}$U/$^{226}$Th radionuclide generator system.

Current Th proton activation investigations include the production of α-emitter $^{225}$Ac. Below proton energies of approximately 75 MeV, the co-production of increased quantities of undesirable long-lived $^{227}$Ac are unavoidable, which has led to a limitation of thorium target thicknesses to 5 g cm$^{-2}$. Nuclear reaction cross section data strongly suggests that actinide isotope $^{230}$Pa is co-produced with $^{225}$Ac in proton irradiated Th targets at significant quantities. Table 2 below shows the quantities of Pa isotopes that would be produced in a 230 μA current proton beam during an irradiation of 10 days. Furthermore, estimated maximum quantities of $^{230}$U are shown that could be harvested following $^{230}$Pa's decay, approximately 27 days following the end of bombardment. Table 2 below summarizes predicted $^{228,230,231}$Pa activities generated in a 5 g cm$^{-2}$ thick Th target during a 10-day irradiation in a 230 μA current proton beam based on nuclear reaction cross sections. The produced $^{230}$U is assumed to be harvested 27 days following the end of bombardment.

TABLE 2

| Isotope and Reaction | $t_{1/2}$ (d) | Yield (GBq) | Yield (mCi) |
|---|---|---|---|
| $^{232}$Th(p,3n)$^{230}$Pa | 17.4 | 148.2 | 4004 |
| $^{230}$Pa –> β$^-$ decay –> $^{230}$U | 20.8 | 4.2 | 113 |
| $^{232}$Th(p,n)Pa$^{232}$ | 1.3 | 164.5 | 4446 |
| $^{232}$Th(p,5n)$^{228}$Pa | 0.9 | 246.3 | 6657 |

Such predicted quantities of $^{230}$U, approximately 4 GBq (100 mCi), are clinically relevant and could easily support studies on the efficacy of radio-therapeutic treatment of cancer.

In summary, protactinium-230, actinium-225, and radium-223 are present along with other radionuclides in a proton beam-irradiated target of thorium metal. The protactinium may be recovered using a combination of anion exchange chromatography for bulk thorium removal, and solid phase extraction chromatography for Pa decontamination. Actinium and radium may be recovered as well. Protactinium-230 is a source for uranium-230 and thorium-226, which are potentially useful alpha emitters for applications related to internal alpha radiation therapy. The process for recovering protactinium may also be used for reprocessing nuclear fuel.

Although the embodiments have been described with reference to specific details, it is not intended that such details should be regarded as limitations of scope except as and to the extent that they are included in the accompanying claims.

What is claimed is:

1. A process for separating actinium from a proton-irradiated thorium target, comprising:
   forming a solution of a proton-irradiated thorium metal target, said solution comprising cationic thorium(IV) and cationic actinium(III);
   evaporating the solution to form a residue;
   dissolving the residue to form a second solution comprising soluble anionic complexes of thorium(IV) and soluble cationic actinium(III); and
   separating the soluble anionic thorium(IV) complexes from the soluble cationic actinium(III).

2. The process of claim 1, wherein the soluble anionic complexes of thorium(IV) comprise citrate.

3. The process of claim 1, wherein the solution of proton irradiated thorium target further comprises hexafluorosilicate.

4. The process of claim 1, wherein the step of separating the soluble anionic thorium(IV) complexes from the cationic actinium(III) comprises loading the solution of soluble thorium anionic thorium(IV) complexes and soluble actinium (III) complexes onto a suitable cation exchanger resin.

5. The process of claim 4, wherein the suitable cation exchanger resin comprises a copolymer lattice of styrene and divinylbenzene with sulfonic acid functional groups attached thereto.

6. A process for separating actinium from a proton-irradiated thorium target, comprising:
   forming a solution of proton-irradiated thorium target, the solution comprising soluble cationic radionuclides, the soluble cationic radionuclides comprising soluble thorium(IV) cations, soluble actinium(III) ions, and soluble radium(II) ions;
   evaporating the solution to form a residue;
   dissolving the residue to form a target solution comprising soluble anionic complexes of thorium(IV);
   loading the target solution onto a cation exchanger resin suitable for retaining cationic species while retaining soluble cationic actinium ions and soluble cationic radium ions, eluting the cationic actinium ions and radium ions from the cation exchange resin, thereby forming an eluant;
   loading the eluant onto a column of an extraction suitable for retaining the cationic actinium ions and cationic radium ions; and
   eluting the radium ions from the extraction resin, and thereafter eluting the actinium ions selectively from the extraction resin.

7. The process of claim 6, wherein the solution of proton-irradiated thorium target comprises hexafluorosilicate.

8. The process of claim 6, wherein the extraction resin comprises N,N,N',N'-tetra-noctyldiglycolamide.

9. The process of claim 6, wherein the extraction resin comprises di(2-ethylhexyl) orthophosphoric acid.

10. The process of claim 6, wherein target solution comprises a carboxylic acid.

11. The process of claim 10, wherein the carboxylic acid is citric acid, tartaric acid, or ethylenediaminetetraacetic acid.

* * * * *